United States Patent Office 3,702,759
Patented Nov. 14, 1972

3,702,759
HERBICIDE RESISTANT CORN SEED METHOD
Otto L. Hoffmann, Shawnee, Kans., assignor to Gulf Research & Development Company, Pittsburgh, Pa.
No Drawing. Continuation-in-part of application Ser. No. 770,856, Oct. 25, 1968, now Patent No. 3,564,768. This application May 27, 1970, Ser. No. 41,068
Int. Cl. A01n 21/02
U.S. Cl. 71—77                     2 Claims

ABSTRACT OF THE DISCLOSURE

Corn is protected from injury by N,N-dialkylthiocarbamate ester pre-emergent herbicide and also a number of other herbicides as for example, 3-amino-2,5-dichlorobenzoic acid and 2-chloro-2′,6′-diethyl-N-(methoxymethyl)-acetanilide by coating the corn seeds prior to planting with 1,8-naphthalic anhydride, the free acid or lower alkyl naphthalate esters or naphthalate salts in combination with an effective amount of S-(2-propynyl)thiosemicarbazide. The combination of seed treating compounds alleviates the growth retarding effect of the naphthalic compounds when used alone.

DESCRIPTION OF THE INVENTION

This is a continuation-in-part of U.S. patent application Ser. No. 770,856, filed Oct. 25, 1968, now U.S. Pat. 3,564,768.

In U.S. Pat. 3,131,509 there is disclosed the coating of crop seeds with a non-phytotoxic quantity of an antogonistic agent for a selective herbicide, thereby protecting the crop from injury when the specific herbicide is employed to control weeds. The aforementioned patent specifically exemplifies the treatment of wheat seed with compounds which are antagonistic to barban and to certain thiocarbamate herbicides. In the aforementioned U.S. patent application Ser. No. 770,856, now U.S. Pat. No. 3,564,768, I disclosed that corn is protected from injury by N,N-dialkylthiocarbamate ester pre-emergent herbicides by coating the corn seed prior to planting with a non-phytotoxic quantity of a bifunctional compound selected from a number of naphthalic compounds and N-substituted diamides. Naphthalic anhydride is particularly desirable as a seed coating agent because it is inexpensive, readily available and may be coated on the seed by very simple procedures by inexperienced workers. I have discovered that this compound improves the resistance of corn seed to a variety of herbicides. These include amiben and alachlor among others. In fact, a general increase in resistance of corn to pre-emergent herbicides of the type which cause deformity of the twisting and curling type in newly emerged plants has been observed. Unfortunately the beneficial effect of the naphthalate compounds is accompanied by a disadvantage. After repeated tests it has been confirmed that these seed treating agents to some extent retard the growth of the corn plants. There does not appear to be any large effect upon the final yield of corn. However, in some corn growing areas the warm weather growing season is very short so that it is necessary to grow only those varieties of *Zea mays* which mature in about two months. A delay of a few days in the maturity of this so-called 60-day corn is considered to be undesirable, even though the combination of treated seed and pre-emergent herbicide virtually eliminates competition from weeds and thereby greatly increases the corn yield.

I have now discovered that corn plants can be protected against injury by pre-emergent herbicides, particularly the S-alkyl N,N-dialkylthiocarbamates, with substantially improved rates of growth of nearly emerged corn plants by coating the seeds prior to planting with a substantially non-phytotoxic quantity of a compound selected from the group consisting of 1,8-naphthalic anhydride, 1,8-naphthalic acid, lower alkyl 1,8-naphthalate esters and salts of 1,8-naphthalic acids in combination with a non-phytotoxic but effective amount of S-(2-propynyl)-thiosemicarbazide, sufficient to alleviate the growth retarding effect of the naphthalic compounds. The propynylsemicarbazide compound may be obtained conveniently by reacting 2-propynyl chloride with thiosemicarbazide in ethanol as reaction solvent at reflux temperature. After reaction is complete, the solvent is evaporated and upon cooling and standing the product crystallizes. By recrystallization from an isopropyl alcohol-ethyl ether solvent mixture a purified product is obtained which melts at 122–124° C. This material, which may be in salt form, is conveniently utilized as a dry, finely divided solid. This invention is described in detail and illustrated with specific examples in the discussion which follows. The improvement of the effect of 1,8-naphthalic anhydride is specifically illustrated in the following examples:

Example 1

A seed coating composition was made by mixing 50 parts by weight 1,8-naphthalic anhydride with 50 parts by weight of S-(2-propynyl)-thiosemicarbazide. Portions of this mixture were used to form a coating on corn seed by agitation and mixing with the seed in proportions of 1, 0.5, 0.25, and 0.12% by weight. Each ingredient was used at the same rates as the mixture, for purposes of comparison. The corn seed was planted in soil, the seed being covered with a thin layer of soil. The herbicide, S-ethyl N,N-dipropylthiocarbamate, was applied by spraying on the surface of the soil at rate of 16 lb./a. Additional soil was then used to cover the herbicide. After 10 days, and at weekly intervals thereafter, the height of the plants was measured. Results are recorded in Table I.

TABLE I.—EFFECT OF SEED TREATMENT ON HEIGHT OF CORN GROWN IN SOIL TREATED WITH THIOCARBAMATE HERBICIDE

| Seed treatment, weight percent | | Corn height (cm.) | | |
|---|---|---|---|---|
| 1,8-naphthalic anhydride | S-(2-propynyl)-thiosemicarbazide | 10 days | 16 days | 24 days |
| 0 | 0 | 5 | 5 | 5 |
| 1.0 | 0 | 12 | 20 | 23 |
| 0.5 | 0 | 14 | 25 | 33 |
| 0.25 | 0 | 15 | 27 | 35 |
| 0.12 | 0 | 13 | 18 | 14 |
| 0 | 1.0 | 15 | 30 | 33 |
| 0 | 0.5 | 17 | 29 | 32 |
| 0 | 0.25 | 17 | 28 | 29 |
| 0 | 0.12 | 13 | 20 | 19 |
| 0.5 | 0.5 | 11 | 28 | 40 |
| 0.25 | 0.25 | 12 | 29 | 46 |
| 0.12 | 0.12 | 13 | 32 | 39 |
| 0.06 | 0.06 | 12 | 30 | 34 |
| (¹) | (¹) | 21 | 42 | 68 |

¹ No herbicide and no seed treatment.

It can be seen from the data in the table that at the end of 24 days, corn grown under normal conditions without either seed coating or use of a pre-emergent herbicide had reached a height of 68 cm. By comparison, when herbicide was applied to the soil, untreated corn grew to 5 cm. and no further. When the corn seed was coated with 0.5 weight percent of S-(2-propynyl)thio- corn grew to 33 cm. in 24 days. When the seed was coated with 0.5 weight percent of S-(2-propynyl)thiosemicarbazide the corn grew to a height of 32 cm. However, when the seed was coated with 0.25 weight percent of each chemical, making a total of 0.5 weight percent, corn height was 46 cm., an improvement of over 39 percent when compared to the effect of either of the seed treating chemicals when used alone. These experiments were carried on with a common commercial variety of corn seed which normally grows to average height, on which growth retarding effects are more apparent than on the shorter, quick-maturing varieties.

Example 2

The procedure in Example 1 was followed with these exceptions: The ratio of the two seed treating chemicals was varied, the plants were carried for a longer time and four replications were used in a randomized block design. Data are recorded in Table II.

TABLE II.—LONG TERM EFFECTS OF VARIOUS SEED COATINGS ON CORN PLANT HEIGHTS IN HERBICIDE-TREATED SOIL

| Seed treatment (weight percent) | | Corn height (cm.) average of four replicates | | | | | Number of healthy plants |
|---|---|---|---|---|---|---|---|
| 1,8-naphthalic anhydride | S-(2-propynyl)-thiosemicarbazide | 7 days | 14 days | 21 days | 28 days | 35 days | |
| 0.5 | 0 | 3 | 9 | 10 | 10 | 10 | 1 |
| 0 | 0.5 | 5 | 14 | 14 | 14 | 15 | 3 |
| 0.25 | 0.25 | 4 | 16 | 26 | 28 | 34 | 14 |
| 0.50 | 0.25 | 4 | 15 | 23 | 26 | 35 | 18 |
| 0.75 | 0.25 | 4 | 14 | 24 | 29 | 32 | 17 |
| (1) | (1) | 4 | 4 | 4 | 4 | 4 | 0 |
| (2) | (2) | 7 | 26 | 40 | 52 | 55 | 20 |

1 Herbicide Check, no seed treatment.
2 Untreated Check, no herbicide, no seed treatment.

From examination of the tabulated data it will be seen that the cooperative effect of the two seed treating chemicals is again demonstrated and the corn plants protected by the combination were growing rapidly at the end of 35 days. The untreated check, it will be noticed, had already passed its initial period of rapid growth at 35 days.

It will be appreciated that the application of the pre-emergent herbicide at a rate of 16 lb. per acre is drastic treatment, requiring the coating of the corn seed with larger amounts of protective chemical and accentuating the growth retarding effect. In actual practice the herbicide would be applied at lower rates than those used in the examples. The coating of corn seed with as much as 1.0 weight percent of protective agent is not normally done since no more than half this amount is actually needed. For purposes of illustration, however, the increased rates give more precise results and accentuate differences in performance, so that quantitative comparisons can be made of both the retarding and alleviating effects.

In one type of corn culture, the production of crossbred or "hybrid" seed, use of large amounts of pre-emergent herbicide is desirable, so as to eliminate both the weeds and volunteer or "rogue" corn plants which can distribute pollent and cause the seed to be nonuniform in hereditary characteristics. The coating of corn seed with the combination of chemicals is particularly effective and useful in this type of corn growing situation.

A preferred combination of active ingredients in a seed-treating composition for the purposes of this invention consists essentially of one part by weight naphthalic anhydride and from about one-third to about one part by weight of S-(2-propynyl)thiosemicarbazide. The dry mixture of ingredients is preferably moistened with a liquid such as methanol to prevent dust formation, is put in a contained in the proper amount, along with corn seed and the seed and chemical are then mixed and agitated, as by shaking or tumbling. Subsequently, a current of air may be used to evaporate the liquid from the coated seed. The resulting corn seed bear thereon a coating of a substantially non-phytotoxic amount of naphthalic anhydride, sufficient to improve the resistance of the corn to S-alkyl thiocarbamate herbicides and a substantially non-phytotoxic amount of S-(2-propynyl)thiosemicarbazide, sufficient to alleviate growth retarding effects.

I claim:
1. In the method of improving the resistance of corn seed to pre-emergent herbicides by coating the seed with an effective but substantially non-phytotoxic amount of a compound selected from the group consisting of
   1,8-naphthalic anhydride,
   1,8-naphthalic acid,
   lower alkyl 1,8-napthalate esters, and
   salts of 1,8-naphthalic acid,
the improvement consisting of also coating the corn seed with an effective but substantially non-phytotoxic quantity of S-(2-propynyl)thiosemicarbazide, sufficient to alleviate growth retarding effects.

2. In the method of improving the resistance of corn seed to pre-emergent herbicides by coating the seed with an effective but substantially non-phytotoxic amount of 1,8-naphthalic anhydride, the improvement consisting of also coating the corn seed with an effective but substantial non-phytotoxic quantity of S-(2-propynyl) thiosemicarbazide sufficient to alleviate growth retarding effects.

References Cited
UNITED STATES PATENTS 3,131,509   5/1964   Hoffmann _____ 71—77
3,564,768   2/1971   Hoffmann _____ 117—3

JAMES O. THOMAS, JR., Primary Examiner

U.S. Cl. X.R.

71—99, 107, 115